United States Patent
Hartmann et al.

(10) Patent No.: US 10,132,953 B2
(45) Date of Patent: Nov. 20, 2018

(54) ELECTROMAGNETIC WAVE PROPAGATION MEASUREMENTS WITHOUT SYNCHRONIZATION

(71) Applicant: BAKER HUGHES INCORPORATED, Houston, TX (US)

(72) Inventors: Andreas Hartmann, Celle (DE); Sheng Fang, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/248,750

(22) Filed: Aug. 26, 2016

(65) Prior Publication Data

US 2018/0059280 A1    Mar. 1, 2018

(51) Int. Cl.
*G01V 3/20* (2006.01)

(52) U.S. Cl.
CPC ...................... *G01V 3/20* (2013.01)

(58) Field of Classification Search
CPC ... G01V 3/18; G01V 3/20; G01V 3/22; G01V 3/24; G01V 3/26; G01V 3/28; G01V 3/30; G01V 3/34; G01V 3/36; G01V 3/38
See application file for complete search history.

(56) References Cited

U.S. PATENT DOCUMENTS

| | | | |
|---|---|---|---|
| 4,899,112 A * | 2/1990 | Clark | G01V 3/30 324/338 |
| 5,081,419 A | 1/1992 | Meador et al. | |
| 5,811,973 A | 9/1998 | Meyer, Jr. | |
| 6,044,325 A * | 3/2000 | Chakravarthy | G01V 3/28 702/7 |
| 6,218,842 B1 | 4/2001 | Bittar et al. | |
| 6,344,746 B1 | 2/2002 | Chunduru et al. | |
| 6,631,328 B2 | 10/2003 | Haugland | |
| 6,646,441 B2 | 11/2003 | Thompson et al. | |
| 6,703,837 B1 | 3/2004 | Wisler et al. | |

(Continued)

OTHER PUBLICATIONS

Okowi, Victor et al., "Challenges in Identifying and Quantifying Hydrocarbons in Thinly Bedded, Laminated, and Low-Resistivity Pay Zones," SPE-172834-MS, pp. 11 (2014).

*Primary Examiner* — Noam Reisner
(74) *Attorney, Agent, or Firm* — Mossman, Kumar & Tyler, PC

(57) ABSTRACT

Methods and apparatus for determining at least one parameter of interest of an earth formation. Methods include using at least one transmitter to initiate at a single location in the formation a first electromagnetic signal at a first frequency and a second electromagnetic signal at a second frequency different than the first frequency for propagation through the formation; receiving the first electromagnetic signal propagating through the formation and the second electromagnetic signal propagating through the formation at a single receiver non-collocated with the at least one transmitter; estimating a relative phase shift of the second electromagnetic signal relative to the first electromagnetic signal; estimating a relative attenuation of the second electromagnetic signal relative to the first electromagnetic signal; using the relative attenuation and the relative phase shift to estimate a parameter of interest of the formation. The receiver may be unsynchronized with respect to the transmitter.

13 Claims, 4 Drawing Sheets

(56) References Cited

U.S. PATENT DOCUMENTS

| | | |
|---|---|---|
| 6,765,385 B2 | 7/2004 | Sinclair et al. |
| 7,228,903 B2 | 6/2007 | Wang et al. |
| 7,755,361 B2 | 7/2010 | Seydoux et al. |
| 7,786,733 B2 | 8/2010 | Seydoux et al. |
| 7,973,532 B2 | 7/2011 | Forgang et al. |
| 8,008,919 B2 | 8/2011 | Wang et al. |
| 8,541,098 B2 | 9/2013 | Allemand |
| 8,614,578 B2 | 12/2013 | Gao et al. |
| 2003/0100994 A1* | 5/2003 | Strickland ............... G01V 3/28 702/7 |
| 2008/0303525 A1* | 12/2008 | Itskovich ............... G01V 3/24 324/351 |
| 2011/0301850 A1* | 12/2011 | Maao ............... G01V 3/083 702/11 |
| 2011/0309833 A1 | 12/2011 | Yang |
| 2013/0080102 A1* | 3/2013 | Seydoux ............... G01V 3/28 702/89 |
| 2014/0019049 A1 | 1/2014 | Dorovsky |
| 2014/0368200 A1 | 12/2014 | Wang et al. |

\* cited by examiner

ELECTROMAGNETIC WAVE PROPAGATION MEASUREMENTS WITHOUT SYNCHRONIZATION

FIELD OF THE DISCLOSURE

This disclosure generally relates to exploration and production of hydrocarbons involving investigations of regions of an earth formation penetrated by a borehole. More specifically, the disclosure relates to interpretation of electromagnetic propagation measurements of an earth formation.

BACKGROUND OF THE DISCLOSURE

Electrical earth borehole logging is well known and various devices and various techniques have been described for this purpose. Broadly speaking, there are two categories of electrical logging apparatus. In the first category, one or more measurement electrodes—current source(s) or sink(s)—are used in conjunction with a return electrode (which may be a diffuse electrode such as a logging tool's body or mandrel). A measurement current flows in a circuit that connects a current source to the measurement electrode(s), through the earth formation to the return electrode, and back to the current source in the tool. In a second category, that of inductive measuring tools, an antenna within the measuring instrument induces a current flow within the earth formation. The magnitude of the induced current is detected using either the same antenna or a separate receiver antenna. The measured responses are affected by properties of the earth formation including electrical conductivity, magnetic permeability, dielectric permittivity and the pore volume or porosity of the rock matrix and water saturation.

Parameters of interest of the formation, such as, for example, resistivity or dielectric constant, may be estimated by transmitting an electromagnetic (EM) wave into the formation, and receiving it at one or more receivers (e.g., at receiver antennas). The attenuation and phase shift between the received signals and the transmitted signals may be determined, which may be used to estimate the dielectric constant of the formation. Alternatively, the attenuation and phase shift between spaced receivers may be used to estimate the dielectric constant of the formation.

SUMMARY OF THE DISCLOSURE

In aspects, the present disclosure is related to methods, apparatus, and produces for determining at least one parameter of interest of an earth formation. Methods include using at least one transmitter to initiate at a single location in the formation a first electromagnetic signal at a first frequency and a second electromagnetic signal at a second frequency different than the first frequency for propagation through the formation; receiving the first electromagnetic signal propagating through the formation and the second electromagnetic signal propagating through the formation at a single receiver non-collocated with the at least one transmitter; estimating a relative phase shift of the second electromagnetic signal relative to the first electromagnetic signal; estimating a relative attenuation of the second electromagnetic signal relative to the first electromagnetic signal; using the relative attenuation and the relative phase shift to estimate a parameter of interest of the formation. The receiver may be unsynchronized with respect to the transmitter. The second frequency is a positive whole number multiple of the first frequency. The relative phase shift of the second electromagnetic signal relative to the first electromagnetic signal may be implemented as a difference between the phase of the second electromagnetic signal and the first electromagnetic signal. The relative attenuation of the second electromagnetic signal relative to the first electromagnetic signal may be a logarithmic ratio of the second electromagnetic signal amplitude to the first electromagnetic signal amplitude.

Methods may include generating a multifrequency signal comprising a plurality of simultaneous sub-signals at the single location including the first electromagnetic signal and the second electromagnetic signal. The second electromagnetic signal transmitted from the transmitter may be synchronized with the first transmitted from the transmitter. Methods may include setting an initial phase at the transmitter for the first electromagnetic signal and an initial phase at the transmitter for the second electromagnetic signal equal to zero. Methods may include setting an initial phase at the transmitter for the first electromagnetic signal to a value equal to f1*t, and an initial phase at the transmitter for the second electromagnetic signal to a value equal to f2*t, wherein f1 is the first frequency, f2 is the second frequency, and t is the time from the initial phase.

Methods may include using the relative attenuation and the relative phase shift to generate a propagation resistivity. Methods may include conveying a first sub and a second sub along at least one borehole formed in the earth formation, wherein the at least one transmitter is disposed on the first sub and the receiver is disposed on the second sub, the first sub and the second sub lacking electrical communication along the carrier therebetween. Methods may include conducting further operations in the formation in dependence upon the parameter of interest.

Apparatus embodiments for determining at least one parameter of interest of a formation may include a carrier including at least one electromagnetic (EM) transmitter and at least one electromagnetic (EM) receiver configured to be conveyed in a borehole; and at least one processor configured to: use at least one transmitter to initiate at a single location in the formation a first electromagnetic signal at a first frequency and a second electromagnetic signal at a second frequency different than the first frequency for propagation through the formation; receive the first electromagnetic signal propagating through the formation and the second electromagnetic signal propagating through the formation at a single receiver of the at least one receiver non-collocated with the at least one transmitter; estimate a relative phase shift of the second electromagnetic signal relative to the first electromagnetic signal; estimate a relative attenuation of the second electromagnetic signal relative to the first electromagnetic signal; and use the relative attenuation and the relative phase shift to estimate a parameter of interest of the formation.

Some embodiments include a non-transitory computer-readable medium product accessible to the processor and having instructions thereon that, when executed, causes the at least one processor to perform methods described above. Apparatus embodiments may include at least one processor and a computer memory accessible to the at least one processor comprising a computer-readable medium having instructions thereon that, when executed, causes the at least one processor to perform methods described above.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1A:
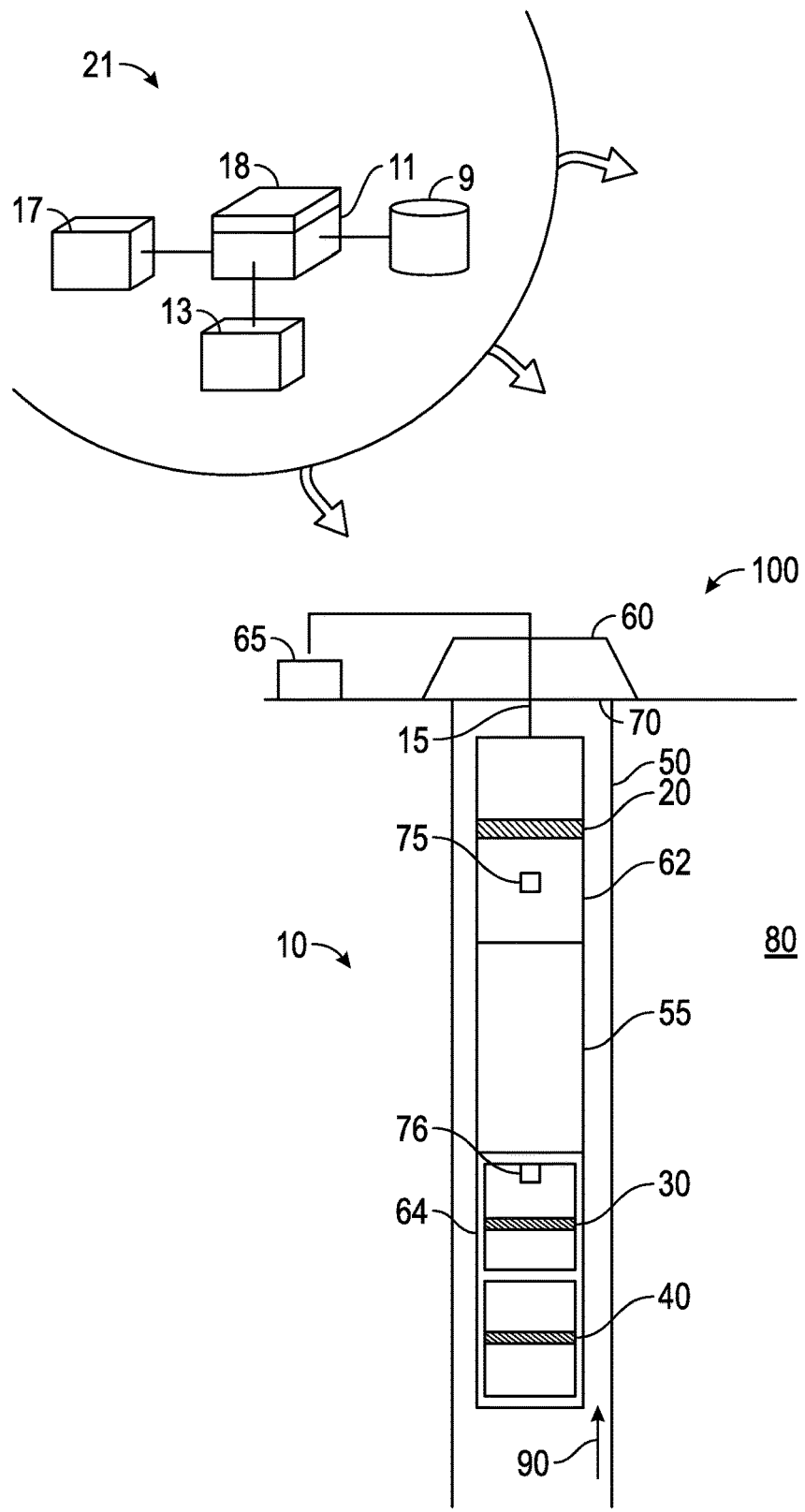
FIG. 1A shows an exemplary embodiment of a system for evaluation of an earth formation using measurements from a downhole electromagnetic tool.

This disclosure generally relates to exploration for hydrocarbons involving electromagnetic investigations of a borehole penetrating an earth formation. These investigations may include estimating at least one parameter of interest of the earth formation.

The present disclosure is susceptible to embodiments of different forms. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein. Indeed, as will become apparent, the teachings of the present disclosure can be utilized for a variety of well tools and in all phases of well construction and production. Accordingly, the embodiments discussed below are merely illustrative of the applications of the present disclosure.

Multiple Propagation Resistivity (MPR) tools are known which make multiple measurements of formation resistivity using an array of antennas that propagate multiple electromagnetic signals at different frequencies. MPR tools may be characterized as deep-reading, thin-bed tools. The MPR tools measure true resistivity even in thin dipping reservoirs invaded by mud filtrate. Tools use symmetric pairs of transmitting antennas, above and below the receivers, to compensate measurements. These tools may be operated in at least two modes. A first mode may be referred to as Mini-MPR (Multiple Propagation Resistivity) mode that may measure attenuation and a phase difference between the two receivers.

In Mini-MPR mode, which may employ two symmetric transmitter antennas, attenuation and phase may be measured at each of the transmitter. The measurements may be averaged to give the final readings:

$$Att = \frac{Att_{T1} + Att_{T2}}{2}; \quad (1)$$

$$Pha = \frac{Pha_{T1} + Pha_{T2}}{2}$$

where the subscripts T1 and T2 denote the first and second transmitters. Assuming a uniform earth formation for which the magnetic fields at the receiver locations are H1 and H2 and assuming that the two receivers have gains $G_1$ and $G_2$, the ratio of the two receiver outputs for the 1st transmitter may be derived from the ratio:

$$R_{T1} = \frac{G_2 H_2}{G_1 H_1} = \frac{G_2}{G_1} \frac{A_2}{A_1} e^{i\Delta\phi} \quad (2)$$

where $A_1$ and $A_2$ are the amplitudes of $H_1$ and $H_2$, respectively; $\Delta\phi$ is the phase difference between the two receivers. From eqn. (5) it follows $$Att_{T1} = -20\log\frac{G_2}{G_1} - 20\log\frac{A_2}{A_1}, \quad (3)$$

$$Pha_{T1} = \Delta\phi. \quad (4)$$

Thus, it is clear that the gain change affects attenuation measurement but not the phase difference measurement. Similarly, attenuation measurement for the 2nd transmitter is derived from $$R_{T2} = \frac{G_1 H_2}{G_2 H_1} = \frac{G_1}{G_2} \frac{A_2}{A_1} e^{i\Delta\phi}. \quad (5)$$

The attenuation measurement may be written as:

$$Att_{T2} = -20\log\frac{G_1}{G_2} - 20\log\frac{A_2}{A_1}. \quad (6)$$

Averaging equations (6) and (9) may remove the effect of gain variation.

Resistivity may be estimated from attenuation and phase difference using a transform, by curve fitting techniques, or using a lookup table. Additional details may be found in U.S. Pat. No. 5,081,419 to Meador et al. and U.S. Pat. No. 4,899,112 to Clark et al., each of which is herein incorporated by reference in its entirety. These measured values can be used to determine and store resistivity from attenuation [$R_{AT}$] and/or resistivity from phase shift [$R_\phi$]. The look-up table can take into account dielectric constant, which can be treated as a function of conductivity. Various corrections may be made to the resistivity values in accordance with techniques of the art. The two values may be associated with various depths of investigation and/or combined as would occur to those of skill in the art.

Those versed in the art would recognize that measurements of amplitude and phase can, in addition to resistivity determination, also be used for determining the dielectric constant of the earth formation. Dielectric logging uses the contrast between dielectric constant of water, rock and oil to estimate the formation water content. The permittivity of the formation can be considered as a complex quantity which contains dielectric constant and conductivity in its real and imaginary component $$\tilde{\varepsilon}_r(\omega) = \varepsilon_r(\omega) + i\frac{\sigma(\omega)}{\omega\varepsilon_0} \quad (7)$$

where $\tilde{\varepsilon}_r$ is the complex value representing relative permittivity, $\varepsilon_r$ is relative dielectric constant, $\sigma$ is electrical conductivity, $\omega$ is angular frequency and $\varepsilon_0$ is dielectric constant of vacuum. In current dielectric logging tools, the magnitude and phase of an electromagnetic wave propagating in the formation is measured at multiple receivers. The relative magnitude and phase of a detected signal at the respective receivers is used to obtain $\varepsilon_r$ and $\sigma$, which are functions of frequency due to the dispersive behavior of the formation. In practice, the measurement is performed at multiple frequencies in order to obtain a good estimate of the dispersive behavior.

The dispersive behavior of the formation is a result of the properties of its constituents (water, rock matrix and hydrocarbon) as well as the volume fraction of each of these phases, their geometry and distribution within a representative volume of the formation. However, the mixture of these three phases exhibits a dispersive behavior different from the weighted average of dispersive behavior of each. There exist several mixing laws (or mixing models) that relate the dielectric behavior of a mixture to the properties of its constituents. Several dielectric models have been set forth which attempt to approximate the permittivity of mixtures in terms of the known dielectric constants and volume fractions of the constituents. Some example mixing models include the Complex Refractive Index Model (CRIM) and Looyenga-Landau-Lifshitz model, along with other exponential models, and variants of the Maxwell-Garnett model, including the Coherent Potential model, and the Symmetric Bruggeman Model.

The parameters of the volume of interest of the formation affecting dielectric behavior of the formation include water saturation, water conductivity, permittivity of dry rock, permittivity of hydrocarbons, textural parameters of the formation (e.g., grain shape), and total porosity. As dielectric dispersive behavior of the volume is sensitive to these parameters, measuring the dielectric behavior of the formation at multiple frequencies provides a means to quantify these parameters.

Measuring the dielectric dispersive behavior of the formation and fitting it to mixing laws that are shown to be representative of the behavior of the formation under study provides information on the volume fraction of each component and formation texture information. This information is invaluable for estimating the hydrocarbon content in the reservoir under study.

Other models may be employed to correlate electrical properties of volumes of interest of an earth formation with other formation properties. One of the most widely used models is the Archie relation, or Archie's law, formulated by Gus Archie. Archie's law is an empirical law that is widely used to calculate the electrical conductivity of the formation based on porosity of rock, water saturation and conductivity. Archie's law (expressed in one format) is as follows:

$$\sigma_{eff} = \frac{1}{a}\phi^m S_w^n \sigma_w \qquad (8)$$

where $\sigma_{eff}$ is conductivity of a formation at DC, $\varphi$ is porosity of the rock matrix of the formation, $S_W$ is water saturation of the formation, $\sigma_W$ is water conductivity of the formation at DC, a is tortuosity factor, m is cementation exponent, and n is saturation exponent. The parameters a, m, and n are referred to as Archie parameters. The cementation exponent is related to connectivity of the pore structure of the rock and it decreases as the fluid permeability of rock increases. The saturation exponent is related to wettability of rock. In the case of water wet rocks, even for low water saturation levels, a continuous electrical path can form due to presence of a thin layer of water around the grains. The tortuosity depends on grain size and pore structure.

As described above, dielectric measurement and evaluation may include the estimation of electric permittivity of materials. Electric permittivity may include imaginary and real parts, which may vary with the frequency of an electrical signal exposed to a material. In some aspects, electric permittivity may be estimated using an electromagnetic tool configured to generate an electric current at a plurality of frequencies.

In conventional MPR resistivity measurements, phase and attenuation difference between two antennas is measured. Thus, for conventional measurements, synchronization is needed for an absolute measurement such as a cross-component measurement. Another approach is to take the phase difference between two receivers to avoid synchronization. For the modular subs used in extra deep resistivity measurements, with considerable spacing between them, this requirement makes synchronization problematic. In aspects of the present disclosure, synchronization is circumvented while avoiding the requirement of multiple receivers by using measurements at two frequencies.

Differential Frequency Measurement Techniques

Aspects of the present disclosure relate to circumventing synchronization using frequency-relative measurements. The waveform of the propagating wave may be affected by the electrical properties (e.g., effective conductivity) of the medium (formation). It is known that this has the effect of changing the amplitude and waveform of the wave measured between receivers (and thus, phase). Traditionally, this difference between the phase and amplitude of the measured signal at spaced receivers has been used to characterize the formation, including estimating parameters of interest.

Aspects of the present disclosure include using relative differences between signals of differing frequencies at a single receiver in the place of phase and amplitude differences across spaced receivers. Methods include using the relative attenuation and the relative phase shift for these signals to generate a propagation resistivity.

In general embodiments, methods, systems, and products are disclosed for determining at least one parameter of interest of a formation. Method embodiments may include using at least one transmitter to initiate at a single location in the formation a first electromagnetic signal at a first frequency and a second electromagnetic signal at a second frequency different than the first frequency for propagation through the formation; receiving the first electromagnetic signal propagating through the formation and the second electromagnetic signal propagating through the formation at a single receiver non-collocated with the at least one transmitter; estimating a relative phase shift of the second electromagnetic signal relative to the first electromagnetic signal; estimating a relative attenuation of the second electromagnetic signal relative to the first electromagnetic signal; and using the relative attenuation and the relative phase shift to estimate a parameter of interest of the formation.

In some aspects, measurements are taken at several frequencies simultaneously at a single receiver, such as, for example, by generating a multifrequency signal comprising a plurality of simultaneous sub-signals at the single location including the first electromagnetic signal and the second electromagnetic signal—that is, by exciting the frequencies simultaneously. The multiple frequencies may also be excited according to a specified time gap. The receiver may be unsynchronized with respect to a transmitter (or another receiver).

In aspects of the disclosure, the transmitted frequencies have a specific relation. For example, the second frequency may be a positive whole number multiple of the first frequency for the determination of a phase difference.

The relative phase shift of the second electromagnetic signal relative to the first electromagnetic signal may comprise a difference between the phase of the second electromagnetic signal and the first electromagnetic signal. The relative attenuation of the second electromagnetic signal relative to the first electromagnetic signal may comprise a logarithmic ratio of the second electromagnetic signal amplitude to the first electromagnetic signal amplitude.

Methods may include sampling the received signals at the first frequency and the second frequency; and performing a transform of the received signals to determine an instantaneous phase. The second electromagnetic signal transmitted from the transmitter may be synchronized with the first transmitted from the transmitter. Methods may include setting an initial phase at the transmitter for the first electromagnetic signal equal to an initial phase at the transmitter for the second electromagnetic signal. For example, the initial phases may each be zero.

Aspects of the disclosure include conveying a first sub and a second sub along at least one borehole formed in the earth formation, wherein the at least one transmitter is disposed on the first sub and the receiver is disposed on the second sub, the first sub and the second sub lacking electrical communication along the carrier therebetween.

FIG. 1A shows an exemplary embodiment of a system for evaluation of an earth formation using measurements from a downhole electromagnetic tool. FIG. 1A schematically illustrates a system 100 having a downhole tool 10 configured to acquire information in a borehole 50 intersecting a volume of interest of an earth formation 80 for estimating resistivity, oil saturation, and/or other parameters of interest of the formation 80. The parameters of interest may include information relating to a geological parameter, a geophysical parameter, a petrophysical parameter, and/or a lithological parameter. Thus, the tool 10 may include sensor components 20 and 30 for detecting physical phenomena indicative of a parameter of interest. Sensor components 20 and 30 may work cooperatively as a single sensor for estimating formation resistivity, dielectric constant, the presence or absence of hydrocarbons, acoustic impedance, bed boundary, formation density, nuclear density, and certain rock characteristics, permeability, capillary pressure, and relative permeability. Tool 10 may also include sensor 40 on sub 66 for detecting parameters of interest.

The system 100 may include a conventional derrick 60 and a conveyance device (or carrier) 15, which may be rigid or non-rigid, and may be configured to convey the downhole tool 10 into wellbore 50 in proximity to formation 80. The carrier 15 may be a drill string, coiled tubing, a slickline, an e-line, a wireline, etc. Downhole tool 10 may be coupled or combined with additional tools. Thus, depending on the configuration, the tool 10 may be used during drilling and/or after the borehole (wellbore) 50 has been formed. While a land system is shown, the teachings of the present disclosure may also be utilized in offshore or subsea applications. The carrier 15 may include embedded conductors for power and/or data for providing signal and/or power communication between a surface control unit 65 at the surface 70 and downhole equipment. The carrier 15 may include a bottom-hole assembly, which may include a drilling motor for rotating a drill bit. Drilling fluid 90 may be present between the formation 80 and the downhole tool 10.

Certain embodiments of the present disclosure, such as surface control unit 65, may be implemented with a hardware environment that includes an information processor 11, an information storage medium 13, an input device 17, processor memory 19, and may include peripheral information storage medium 9. The hardware environment may be in the well, at the rig, or at a remote location. Moreover, the several components of the hardware environments may be distributed among those locations. The input device 17 may be any data reader or user input device, such as data card reader, keyboard, USB port, etc. The information storage medium 13 stores information provided by the detectors. Information storage medium 13 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 13 stores a program that when executed causes information processor 11 to execute the disclosed method. Information storage medium 13 may also store the formation information provided by the user, or the formation information may be stored in a peripheral information storage medium 9, which may be any standard computer information storage device, such as a USB drive, memory stick, hard disk, removable RAM, or other commonly used memory storage system known to one of ordinary skill in the art including Internet based storage. Information processor 11 may be any form of computer or mathematical processing hardware, including Internet based hardware. When the program is loaded from information storage medium 13 into processor memory 19 (e.g. computer RAM), the program, when executed, causes information processor 11 to retrieve detector information from either information storage medium 13 or peripheral information storage medium 9 and process the information to estimate a parameter of interest. Information processor 11 may be located on the surface (e.g., surface control unit 65) or downhole (e.g., downhole tool control units 75 and 76).

As described herein, "borehole" or "wellbore" refers to a single hole that makes up all or part of a drilled well. Depending on the configuration, the system may be used during drilling and/or after the wellbore has been formed. While a land system is shown, the teachings of the present disclosure may also be utilized in offshore or subsea applications.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, an information processing device includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

In other embodiments, such electronics may be located elsewhere (e.g., at the surface, or remotely). To perform the measurement during a single trip, the tool may use a high bandwidth transmission to transmit the information acquired using sensor components 20 and 30 to the surface for analysis. For instance, a communication line for transmitting the acquired information may be an optical fiber, a metal conductor, or any other suitable signal conducting medium. It should be appreciated that the use of a "high bandwidth" communication line may allow surface personnel to monitor and control the measurement activity in "real time." Each of the components described above may be implemented as one or more electrical components, such as integrated circuits (ICs), operatively connected via a circuit board in accordance with techniques of the present disclosure.

A point of novelty of the system illustrated in FIG. 1A is that the control unit(s), together with electromagnetic transmission and receiving components, are configured to perform certain methods (discussed below) that are not in the prior art. A surface control unit and/or downhole control unit may be configured to control sensors described above and to estimate a parameter of interest according to methods described herein. Control of these components may be carried out using one or more models or algorithms using methods described below.

Mathematical models, look-up tables, or other models representing relationships between the signals and the values of the formation properties may be used to characterize operations in the formation or the formation itself, optimize one or more operational parameters of a production or development, and so on. The system may carry out these actions through notifications, advice, and/or intelligent control.

Various types of electrical sensors may be used in evaluating the formation in accordance with embodiments disclosed herein. As one example, sensors that are based on electromagnetic (EM) wave propagation are used for many applications where amplitude and phase of wave traveled in an unknown medium are studied to infer the properties of that medium. Although aspects of the disclosure may be particularly useful in addressing challenges associated with (EM) wave propagation, particular embodiments may employ the techniques disclosed herein in connection with various types of induction logging, including multi-component induction logging. In some embodiments, the electromagnetic tool may include at least one transmitting antenna and at least one receiving antenna, which may be disposed on a tool body, such as a tool mandrel or other tool housing, mounted on a pad, and so on as will occur to those of skill in the art.

The resistivity tool 10 includes a first sub 62 and a second sub 64. The first sub and the second sub cooperate to generate at least one measurement. The tool may be configured for deep azimuthal investigation by operating at a low frequency. As used herein, a low frequency may be a frequency at or below 500 KHz. As used herein, a "deep" investigation is an investigation of the formation at least ten meters radially away from the wellbore.

The subs 62, 64 may be separated by unrelated equipment 55. By unrelated, it is meant that the equipment does not operationally interact with the receivers and transmitters of the subs 62, 64 (i.e., emit or detect signals associated operation of the subs 62, 64 or transmit clock or other synchronization information between the subs). In some cases no signals are transmitted between the subs via the unrelated equipment, and the first sub and the second sub may lack electrical communication along the carrier therebetween. The term "sub" refers to a unitary body of oil field well equipment and may be a tool string, a housing, support, frame, enclosure, or carrier. In some conventions, a standard sub may have a length of 30 feet or a length of 10 meters. In one sense, a "sub" is sufficiently functionally and structurally integral to enable onboard equipment share the same electronic components; e.g., a clock for synchronizing measurements. For a single measurement, the transmitter and the receiver used may be on different subs and may be separated by an axial distance of ten meters or more.

Figure 1B:
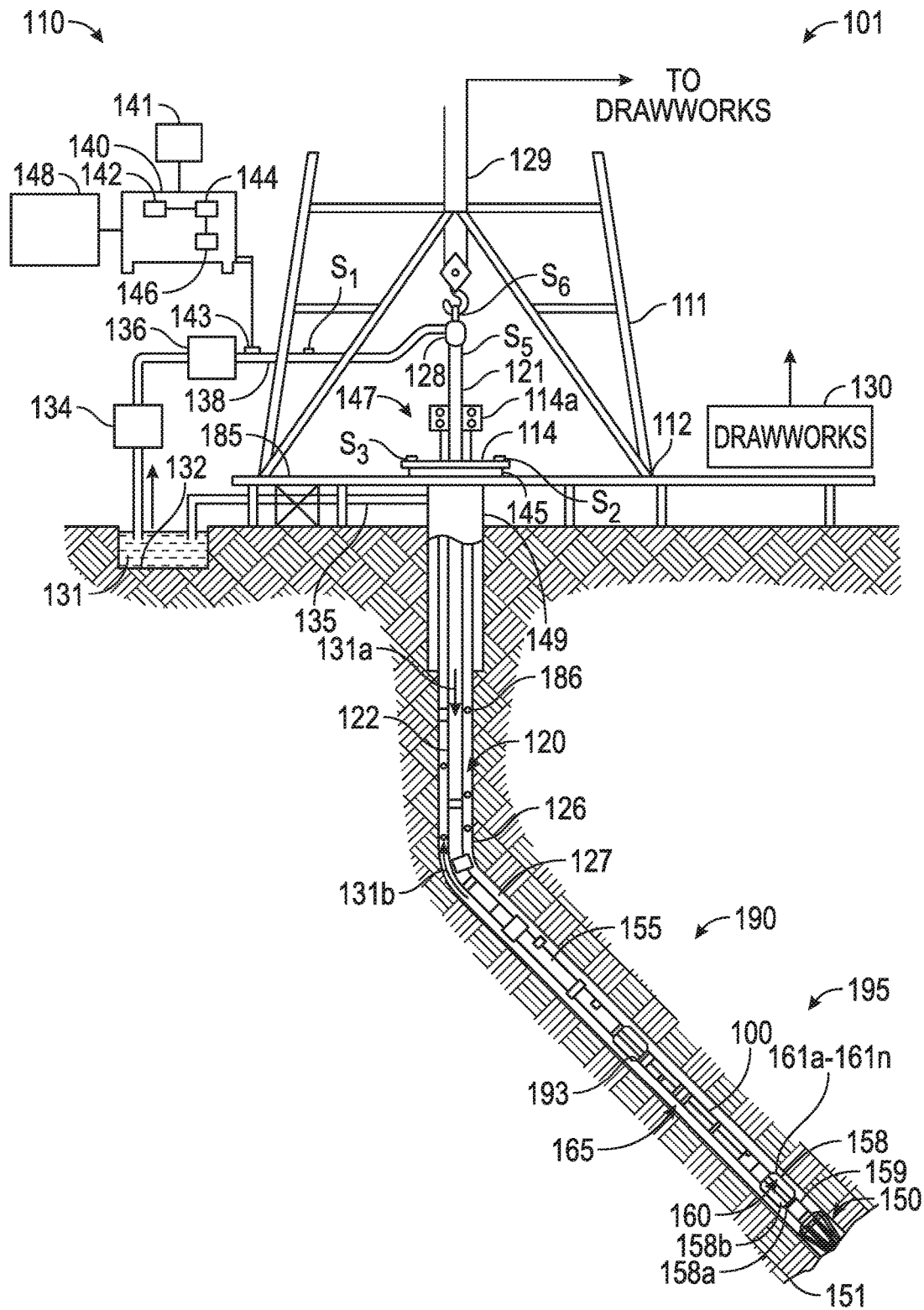
FIG. 1B shows an exemplary embodiment of an MWD system for evaluation of an earth formation using measurements from a well logging tool.

Aspects of the present disclosure are subject to application in various different embodiments. In some general embodiments, carrier 15 is implemented as a tool string of a drilling system, and measurements taken in the borehole may be characterized as "logging-while-drilling" (LWD) or "measurement-while-drilling" (MWD) operations. FIG. 1B shows an exemplary embodiment of an MWD system for evaluation of an earth formation using measurements from a well logging tool. The system 101 includes a carrier 111 that is shown disposed in a wellbore or borehole 126 that penetrates at least one earth formation 195.

FIG. 1B shows a drill string 120 including a bottomhole assembly (BHA) 190 conveyed in the borehole 126 as the carrier. The drilling system 101 includes a conventional derrick 111 erected on a platform or floor 112 which supports a rotary table 114 that is rotated by a prime mover, such as an electric motor (not shown), at a desired rotational speed. A tubing (such as jointed drill pipe 122), having the drilling assembly 190, attached at its bottom end extends from the surface to the bottom 151 of the borehole 126. A drill bit 150, attached to drilling assembly 190, disintegrates the geological formations when it is rotated to drill the borehole 126. The drill string 120 is coupled to a drawworks 130 via a Kelly joint 121, swivel 128 and line 129 through a pulley. Drawworks 130 is operated to control the weight on bit ("WOB"). The drill string 120 may be rotated by a top drive (not shown) instead of by the prime mover and the rotary table 114. Alternatively, a coiled-tubing may be used as the tubing 122. A tubing injector 114a may be used to convey the coiled-tubing having the drilling assembly attached to its bottom end. The operations of the drawworks 130 and the tubing injector 114a are known in the art and are thus not described in detail herein.

A suitable drilling fluid 131 (also referred to as the "mud") from a source 132 thereof, such as a mud pit, is circulated under pressure through the drill string 120 by a mud pump 134. The drilling fluid 131 passes from the mud pump 134 into the drill string 120 via a discharger 136 and the fluid line 138. The drilling fluid 131a from the drilling tubular discharges at the borehole bottom 151 through openings in the drill bit 150. The returning drilling fluid 131b circulates uphole through the annular space 127 between the drill string 120 and the borehole 126 and returns to the mud pit 132 via a return line 135 and drill cutting screen 185 that removes the drill cuttings 186 from the returning drilling fluid 131b. A sensor S1 in line 138 provides information about the fluid flow rate. A surface torque sensor S2 and a sensor S3 associated with the drill string 120 respectively provide information about the torque and the rotational speed of the drill string 120. Tubing injection speed is determined from the sensor S5, while the sensor S6 provides the hook load of the drill string 120.

In some applications, the drill bit 150 is rotated by only rotating the drill pipe 122. However, in many other applications, a downhole motor 155 (mud motor) disposed in the BHA 190 also rotates the drill bit 150. The rate of penetration (ROP) for a given BHA largely depends on the WOB or the thrust force on the drill bit 150 and its rotational speed.

A surface control unit or controller 140 receives signals from the downhole sensors and devices via a sensor 143 placed in the fluid line 138 and signals from sensors S1-S6 and other sensors used in the system 101 and processes such signals according to programmed instructions provided to the surface control unit 140. The surface control unit 140 displays drilling parameters and other parameters of interest related to the borehole, formation, and drilling operations, and other information on a display/monitor 141 that is utilized by an operator to control the drilling operations. The surface control unit 140 may be a computer-based unit that may include a processor 142 (such as a microprocessor), a storage device 144, such as a solid-state memory, tape or hard disc, and one or more computer programs 146 in the storage device 144 that are accessible to the processor 142 for executing instructions contained in such programs. The surface control unit 140 may further communicate with a remote control unit 148. The surface control unit 140 may process data relating to the drilling operations, data from the sensors and devices on the surface, and data received from downhole; and may control one or more operations of the downhole and surface devices. The data may be transmitted in analog or digital form.

The BHA 190 may include a tool 110 configured for performing well logging measurements. The BHA 190 may also contain other formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 195 surrounding the BHA 150. For convenience, all such sensors are generally denoted herein by numeral 165. The BHA 190 may further include a variety of other sensors and devices 159 for determining one or more properties of the BHA 190, such as vibration, bending moment, acceleration, oscillations, whirl, stick-slip, weight-on-bit, fluid flow rate, pressure, temperature, rate of penetration, azimuth, tool face, drill bit rotation, etc.

The BHA 190 may include a steering apparatus or tool 158 for steering the drill bit 50 along a desired drilling path. In one aspect, the steering apparatus may include a steering unit 160, having a number of force application members 161a-161n. The force application members may be mounted directly on the drill string, or they may be at least partially integrated into the drilling motor. In another aspect, the force application members may be mounted on a sleeve, which is rotatable about the center axis of the drill string. The force application members may be activated using electro-mechanical, electro-hydraulic or mud-hydraulic actuators. In yet another embodiment the steering apparatus may include a steering unit 158 having a bent sub and a first steering device 158a to orient the bent sub in the wellbore and the second steering device 158b to maintain the bent sub along a selected drilling direction. The steering unit 158, 160 may include near-bit inclinometers and magnetometers.

The drilling system 101 may include sensors, circuitry and processing software and algorithms for providing information about desired drilling parameters relating to the BHA, drill string, the drill bit and downhole equipment such as a drilling motor, steering unit, thrusters, etc. Many current drilling systems, especially for drilling highly deviated and horizontal wellbores, utilize coiled-tubing for conveying the drilling assembly downhole. In such applications a thruster may be deployed in the drill string 120 to provide the required force on the drill bit.

Exemplary sensors for determining drilling parameters include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED.

The drilling system 101 can include one or more downhole processors at a suitable location such as 193 on the BHA 190. The processor(s) can be a microprocessor that uses a computer program implemented on a suitable non-transitory computer-readable medium that enables the processor to perform the control of system 101 and processing of information, such as information from the sensors. The non-transitory computer-readable medium may include one or more ROMs, EPROMs, EAROMs, EEPROMs, flash memories, RAMs, hard drives and/or optical disks. Other equipment such as power and data buses, power supplies, and the like will be apparent to one skilled in the art. In one embodiment, the MWD system utilizes mud pulse telemetry to communicate data from a downhole location to the surface while drilling operations take place. The surface processor 142 can process the surface measured data, along with the data transmitted from the downhole processor, to evaluate the formation.

Surface processor 142 or downhole processor 193 may also be configured to control steering apparatus 158, mud pump 134, drawworks 130, rotary table 114, downhole motor 155, other components of the BHA 190, or other components of the drilling system 101. Surface processor 142 or downhole processor 193 may be configured to control sensors described above and to estimate a parameter of interest according to methods described herein.

Control of these components may be carried out using one or more models using methods described below. For example, surface processor 142 or downhole processor 193 may be configured to modify drilling operations i) autonomously upon triggering conditions, ii) in response to operator commands, or iii) combinations of these. Such modifications may include changing drilling parameters, steering the drillbit (e.g., geosteering), altering the drilling fluid program, activating well control measures, and so on. Control of these devices, and of the various processes of the drilling system generally, may be carried out in a completely automated fashion or through interaction with personnel via notifications, graphical representations, user interfaces and the like. Reference information accessible to the processor may also be used. In some general embodiments, surface processor 142, downhole processor 193, or other processors (e.g. remote processors) may be configured to operate the well logging tool 110 to make well logging measurements. Each of these logical components of the drilling system may be implemented as one or more electrical components, such as integrated circuits (ICs), operatively connected via a circuit board in accordance with techniques of the present disclosure.

The system 101 may include any number of downhole tools for various processes including formation drilling, geosteering, and formation evaluation (FE) for making measurements versus depth and/or time of one or more physical properties in or around a borehole, including a volume of interest of the formation intersected by the borehole. The tool 110 may be included in or embodied as a BHA, drillstring component or other suitable carrier.

While a drill string 120 is shown as a conveyance device for tool 110, it should be understood that embodiments of the present disclosure may be used in connection with tools conveyed via rigid (e.g. jointed tubular or coiled tubing) as well as non-rigid (e. g. wireline, slickline, e-line, etc.) conveyance systems. The drilling system 101 may include a bottomhole assembly and/or sensors and equipment for implementation of embodiments of the present disclosure on either a drill string or a wireline.

Figure 2:
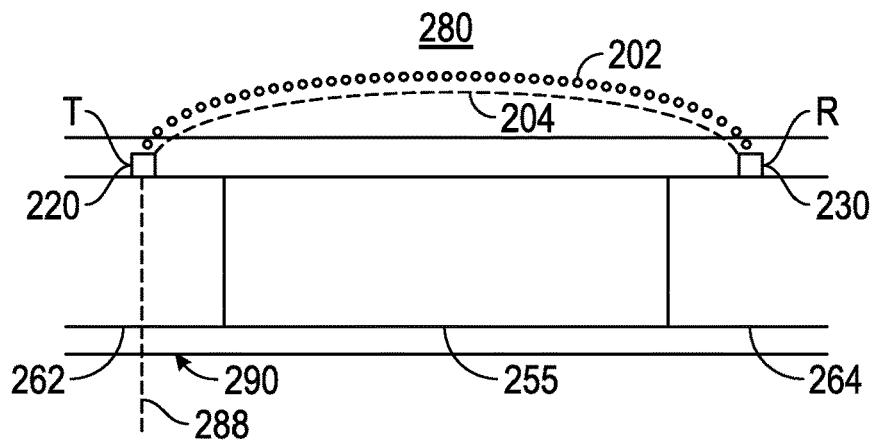
FIG. 2 depicts a cross-sectional view of downhole tool in a homogenous medium.

FIG. 2 depicts a cross-sectional view of downhole tool 210 (e.g., electromagnetic tool, dielectric tool, or other logging tool, etc.) in a homogenous medium. The tool 210 is configured such that, rather than measuring the phase shift and amplitude at two different points, the phase shift and amplitude ratio are measured at the same point at two frequencies.

At least one processor is configured to use transmitter 220 (T) to initiate at a single location (borehole depth 288) in the formation 280 a first electromagnetic signal 202 at a first frequency ($f_1$) (i.e. a progating EM wave) and a second electromagnetic signal 204 at a second frequency ($f_2$) different than the first frequency (forming a second EM wave) for propagation of the EM waves through the formation 280. Thus, EM waves are generated by transmitter 220.

The at least one processor is configured to receive the first electromagnetic signal propagating through the formation and the second electromagnetic signal propagating through the formation at a single receiver non-collocated with the at least one transmitter. The phase shift of each measured signal ($\theta$) at receiver 230 (R) responsive to the transmitted signal may be equal to the phase shifts of the transmitter T and receiver R, as well as the phase shift due to a wave traveling in the probed medium between transmitter T and receiver R, which may be expressed as $$\theta = \theta_T + \theta_R + \theta_M \quad (9)$$

in which $\theta_T$ and $\theta_R$ are the phase shifts of transmitter and receiver with respect to a common source and $\theta_M$ is the phase shift due to wave traveling in the probed medium between transmitter and receiver. The relative phase shift of the second electromagnetic signal relative to the first electromagnetic signal may comprise a difference between the phase of the second electromagnetic signal and the first electromagnetic signal. The relative attenuation of the second electromagnetic signal relative to the first electromagnetic signal may comprise a logarithmic ratio of the second electromagnetic signal amplitude to the first electromagnetic signal amplitude. The calculated PD and Amp may be estimated without any synchronization between transmitter and receiver. Therefore, tool 10 may be configured with transmitter and receiver far apart.

As described above, it is well known in the art to take a differential measurement using two propagating waves of the same frequency over different distances (e.g., using two transmitters having different transmitter locations, two receivers having different receiver locations, and so forth), by exploiting the difference in phase and amplitude between the measurements. It is further known to estimate parameters of interest (e.g., propagation resistivity) of a volume of the formation using these phase difference and attenuation measurements (collectively, MPR measurements).

In novel aspects of the disclosure, relationships exist between the two EM waves 202 and 204 of the present disclosure which may allow an estimation of the conventional phase difference and amplitude measurements from the frequency differential measurements of signal 202 and 204. Parameters of interest of the formation may then be estimated according to conventional MPR techniques (e.g., treating waves 202 and 204 as sinusoidal). The second frequency may be a positive whole number multiple of the first frequency if the phase difference measurement is desired.

One wave has an adjustable phase offset versus the other. This offset can be recovered by measuring the instantaneous phase at any point of the sine waves. The instantaneous phase may be measured by sampling the received signals; and performing a transform of the received signals to determine an instantaneous phase. For example, determining the instantaneous phase may comprise exciting both frequencies and doing a Fast Fourier Transform (FFT) on the data.

Methods may include measuring at several frequencies simultaneously at a single receiver that is not synchronized to a transmitter or a second receiver. The transmitted frequencies may have a specific phase relation and a specific amplitude ratio, i.e. $Amp_1 = Amp_2 \ldots = Amp_N$. A reference frequency, typically the lowest frequency, may be designated. At the receiver, the frequency mix is received and phases and magnitudes are determined. Using the known relationships at the transmitter, the relative phase shift and relative attenuation of all frequencies relative to the reference frequency can be determined. This may be referred to as the excess phase shift and excess attenuation the higher frequencies experience relative to the lower reference frequency. This procedure gives N−1 readings of phase and attenuation when N frequencies are used.

Setting the initial phase at the transmitter to zero, the remaining phase delay is due to the formation. Thus, the second electromagnetic signal transmitted from the transmitter may be synchronized with the first electromagnetic signal transmitted from the transmitter, such as, for example, by comprising setting an initial phase at the transmitter for the first electromagnetic signal equal to an initial phase at the transmitter for the second electromagnetic signal (e.g., an initial phase of zero for both signals). In one example, this may be carried out by generating a multifrequency signal comprising a plurality of simultaneous sub-signals at the single location including the first electromagnetic signal and the second electromagnetic signal.

For two signals having, respectively, frequencies $f_H$ (the higher frequency) and $f_L$ (the lower frequency), excited by a transmitter, a phase difference (PD) and an amplitude ratio (Amp) may be calculated from the corresponding received signals $S_H$ and $S_L$ as follows:

$$PD = Phase(S_H) - [f_H/f_L * Phase(S_L)], \quad (10)$$

$$Amp = abs[S_H/S_L], \quad (11)$$

where $f_H/f_L = n$; and n is a positive integer greater than one.

In embodiments, multiple data sets can be obtained in this way from a plurality of measurements using various frequency pairs. The multiple data sets may be used in an inversion to account for borehole effects. Similarly, tools may include more than one transmitter and receiver, such that measurements as above can be taken over various lengths of the borehole, either for distribution or for increased accuracy via statistical processes (e.g., averaging the propagation resistivity values from each set of measurements), inversion, neural networks, and so on.

Figure 3A:
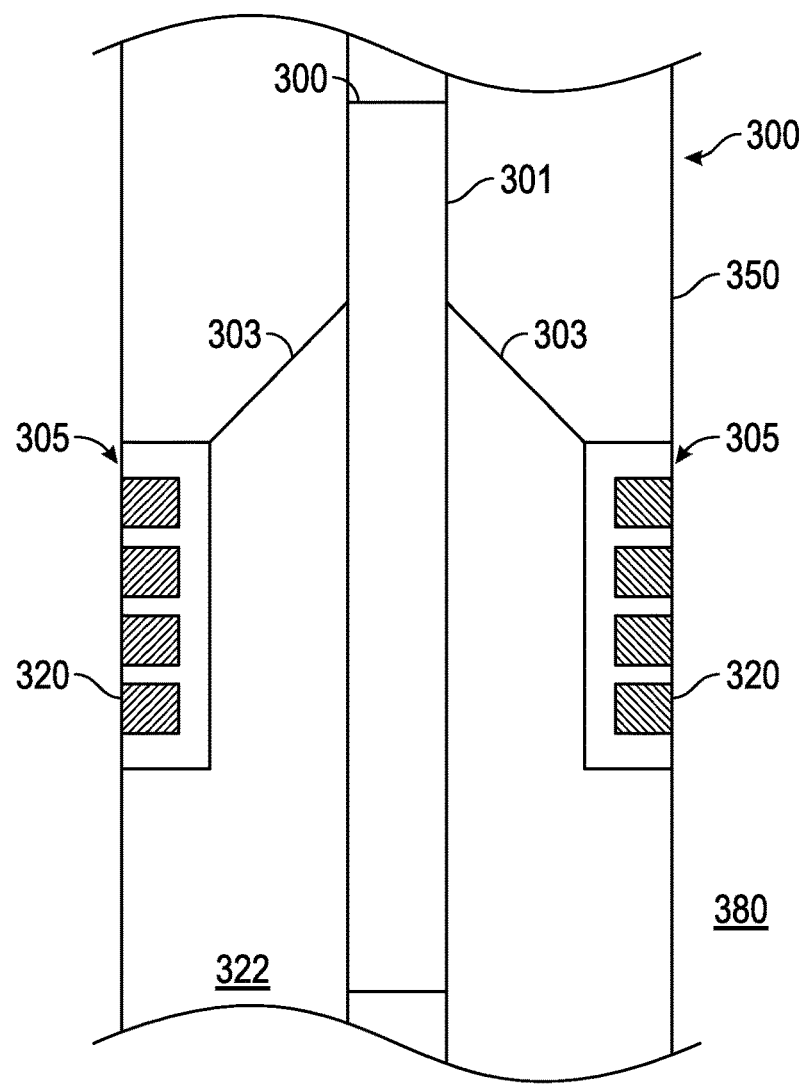
FIG. 3A shows a sub for evaluating an earth formation according to embodiments of the present disclosure.

FIG. 3A shows a sub for evaluating an earth formation according to embodiments of the present disclosure. The sub 300 may be disposed on carrier 15 (not shown) intersecting the earth formation. The sub 300 may include a sub body (e.g., BHA, housing, enclosure, drill string, wireline tool body) 301 having pads 305 extended on extension devices 303. Two pads are shown for illustrative purposes and, in actual practice, there may be more or fewer pads, such as three pads separated by about 120 degrees circumferentially or six pads separated by about 60 degrees. The extension devices 305 may be electrically operated, electromechanically operated, mechanically operated or hydraulically operated. With the extension devices 303 fully extended, the pads (dielectric tool pads) 305 may engage the borehole 350 and make measurements indicative of at least one parameter of interest of the earth formation, such as (i) a water saturation of the formation, (ii) a water conductivity of the formation, (iii) a relative complex permittivity of the formation, (iv) a permittivity of rock matrix, (v) a complex permittivity of mudcake, (vi) a thickness of the mudcake, (vii) a texture of the rock, (viii) cementation exponent, (ix) saturation exponent, (x) cation exchange capacity.

Pads 305 may include a face configured to engage the borehole 350. The term "engage," as used herein, may be defined as in contact with the borehole, urged against the borehole, pressed firmly against the borehole, or positioned proximate the borehole. The term "proximate," as used herein, may be defined as the pad being near the borehole such that measurements may be taken from the pad that are useful in evaluating the borehole, earth formation, or both. The term "face" refers to the surface, edge, or side of the tool body or pad that is closest to the borehole wall.

Pads 305 may include components 320, which may be configured as transmitters, receivers, or selectable as either. The transmitters may be configured to radiate EM waves into the formation; and the receivers may be configured to be responsive to the EM waves radiating in the formation and generate a signal that is indicative of the parameter of interest (e.g., phase shift, amplitude, water saturation, water conductivity, or permittivity of the formation, salinity). A processor may be configured to estimate the frequency differential amplitude attenuation and phase difference between the transmitted signals and the received signals, as described above, which are used to estimate the parameter of interest. This processing may be done downhole or at the surface, by using one or more processors (e.g., hardware environment 21 of FIG. 1).

Figure 3B:
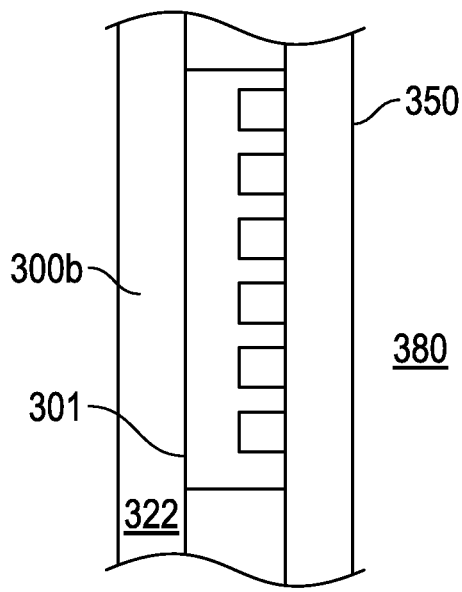
FIG. 3B shows a cross-sectional view of another sub in accordance with embodiments of the present disclosure.

FIG. 3B shows a cross-sectional view of another sub 300*b* in accordance with embodiments of the present disclosure. Sub 300*b* may include tool body 301 having components 321, which may be configured as transmitters, receivers, or selectable as either. For a pair of subs (e.g., subs 62 and 64), each transmitter on a first sub may, in turn, generate a signal which is then received by at least one receiver on a second sub.

As non-limiting examples, each transmitter or receiver may be configured as a loop antenna, a coil antenna, a monopole antenna, a dipole antenna, an antenna array, a patch antenna, a reflector antenna, a log-periodic antenna, etc. Each transmitter or receiver may be configured to operate at a plurality of frequencies.

Figure 4:
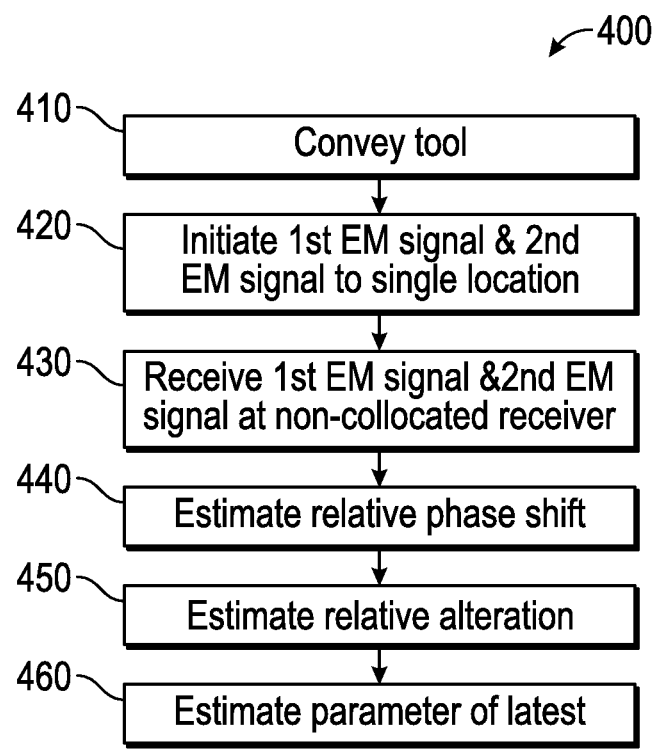
FIG. 4 illustrates a method for determining at least one parameter of interest of a formation.

FIG. 4 illustrates a method for determining at least one parameter of interest of a formation. At optional step 410, the method may include conveying an electromagnetic tool in a borehole proximate a volume of interest of an earth formation. Step 410 may be carried out by conveying a first sub and a second sub along at least one borehole formed in the earth formation, wherein the at least one transmitter is disposed on the first sub and the receiver is disposed on the second sub, the first sub and the second sub lacking electrical communication along the carrier therebetween. Conveying the tool may include conveying the tool on a drillstring by rotating a drillbit on a bottom hole assembly (BHA) at the distal end of the drill string to extend the borehole, tripping the tool on a wireline, and so on.

At optional step 420, the method may include using at least one transmitter to initiate at a single location in the formation a first electromagnetic signal at a first frequency and a second electromagnetic signal at a second frequency different than the first frequency for propagation through the formation. Step 420 may be carried out by exciting each of one or more transmitters in the borehole at a plurality of frequencies. Steps 410 and 420 may be carried out by using at least one processor to direct the carrier or other drilling or borehole equipment, or control the transmitters, either directly, or by using commands to intermediate processors (e.g., controllers, DSPs, and the like) in operative connection with measurement circuitry including signal generators, amplifiers, power sources, data storage, etc. to generate and measure electromagnetic phenomena (e.g., a propagating wave).

Step 430 may comprise receiving the first electromagnetic signal propagating through the formation and the second electromagnetic signal propagating through the formation at a single receiver non-collocated with the at least one transmitter. Step 430 may be carried out by receiving the pair of signals at each of one or more receivers responsive to the excitations. Step 440 may include estimating a relative phase shift of the second electromagnetic signal relative to the first electromagnetic signal. Step 450 may include estimating a relative attenuation of the second electromagnetic signal relative to the first electromagnetic signal. Step 460 may include using the relative attenuation and the relative phase shift to estimate a parameter of interest of the formation.

An inversion may be carried out by inverting for permittivity and conductivity using a wholespace model as an initial guess. In the whole space inversion, first the synthetic tool response in an isotropic whole-space model, i.e., without horizontal or vertical boundaries, is calculated. The synthetic whole-space response is then compared with measured field data at each logging depth and the respective parameter values are adjusted to match the synthetic responses with the measured field responses. In performing the match, other drilling or measurement parameters may also be used as input parameters.

Step 460 may include fitting a mixing model to dielectric measurements at a plurality of frequencies to estimate values for parameters of interest of the volume, such as, for example, salinity of the water of the formation, water saturation of the formation, and permittivity of the rock matrix of the formation. This may include performing an inversion.

Other, optional, steps may include evaluating the formation or modeling the formation using the parameters of interest, conducting secondary recovery operations in dependence upon the estimated parameters, the model, or combinations of these. Secondary recovery operations may include any or all of drilling operations, injection operations, production operations, and the like. For example, the method may include commencing, modifying, continuing, or halting one or more drilling or production operations in dependence upon a model of the formation characterizing particular volumes of interest as having particular properties (e.g., values of one or more parameters of interest).

Mathematical models, look-up tables, neural networks, or other models representing relationships between the signals and the values of the formation properties may be used to characterize the drilling operation, optimize one or more drilling parameters of a drilling operation, change direction of drilling, or otherwise modify drilling operations in the borehole. The system may carry out these actions through notifications, advice, and/or intelligent control.

The term "conveyance device" or "carrier" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, and self-propelled tractors. "Tubular," as used herein, means one or more segments of tubular, including, for example, drill pipe, drill collar, mandrel and so on.

Implicit in the processing of data is the use of a computer program implemented on a suitable non-transitory machine-readable medium (non-transitory computer-readable medium) that enables the processor to perform the control and processing. The non-transitory machine-readable medium may include ROMs, EPROMs, EAROMs, Flash Memories, Optical disks, and Hard disks. As noted above, the processing may be done downhole or at the surface, by using one or more processors. In addition, results of the processing, such as an image of a resistivity property or permittivity, can be stored on a suitable medium.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, a processor includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

Thus, configuration of the processor may include operative connection with resident memory and peripherals for executing programmed instructions. In some embodiments, estimation of the parameter of interest may involve applying a model. The model may include, but is not limited to, (i) a mathematical equation, (ii) an algorithm, (iii) a database of associated parameters, or a combination thereof.

Estimated parameters of interest may be stored (recorded) as information or visually depicted on a display. The parameters of interest may be transmitted before or after storage or display. For example, information may be transmitted to other downhole components or to the surface for storage, display, or further processing. Aspects of the present disclosure relate to modeling a volume of an earth formation using the estimated parameter of interest, such as, for example, by associating estimated parameter values with portions of the volume of interest to which they correspond, or by representing boundary and formation information in a global coordinate system. The model of the earth formation generated and maintained in aspects of the disclosure may be implemented as a representation of the earth formation stored as information. The information (e.g., data) may also be transmitted, stored on a non-transitory machine-readable medium, and/or rendered (e.g., visually depicted) on a display.

Method embodiments may include conducting further operations in the earth formation in dependence upon measurements, estimated parameters of interest (e.g., formation properties), or upon models created using ones of these. Further operations may include at least one of: i) geosteering; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) drilling the borehole; and x) producing one or more hydrocarbons from the formation information.

As used above, a processor is any device that transmits, receives, manipulates, converts, calculates, modulates, transposes, carries, stores, or otherwise utilizes information. In several non-limiting aspects of the disclosure, an information processing device includes a computer that executes programmed instructions for performing various methods. Herein, the term "information" may include one or more of: raw data, processed data, and signals.

A location refers to a borehole depth within a single borehole. Transmitting from a single location in the formation refers to a condition wherein a location of a first signal transmission is substantially different than a location of a second signal transmission. Transmissions may be from the same or different transmitters and made simultaneously, sequentially, intermittently, irregularly, etc. "Substantially different" as used herein means not substantially the same. "Substantially the same," or "substantially similar" as used herein means from a position, with all other variables unchanged, producing a value within a common statistical deviation, such as within one standard deviation, within 5 percent, within 1 percent of a moving average and so on. Substantially the same refers to values within the generally held value for common deviation, such as, for example, due to noise. Collocated, as used herein, refers to antennas placed at substantially the same axial location.

As described herein, "complex permittivity" refers to a permittivity having a real part, which is commonly called the dielectric constant, and an imaginary part, which is commonly called the dielectric loss factor or loss tangent. As described herein, the terms "cementation exponent" and "saturation exponent" refer to parameters of Archie's law including the exponent m and the exponent n, respectively.

The term "mixing model" refers a quantitatively expressed relation between the dielectric behavior of a mixture and the properties of its constituents. More specifically, in the context of the present disclosure, these constituents refer to the rock matrix of the formation and the water and hydrocarbon within. The relation may include details such as the volume fraction of each of these phases, their geometry and distribution within a representative volume of the formation.

Estimated parameters of interest may be stored (recorded) as information or visually depicted on a display. Aspects of the present disclosure relate to modeling a volume of an earth formation using the estimated parameter of interest, such as, for example, by associating estimated parameter values with portions of the volume of interest to which they correspond. The model of the earth formation generated and maintained in aspects of the disclosure may be implemented as a representation of the earth formation stored as information. The information (e.g., data) may be stored on a non-transitory machine-readable medium, and rendered (e.g., visually depicted) on a display.

Control of components of apparatus and systems described herein may be carried out using one or more models as described above. For example, at least one processor may be configured to modify operations i) autonomously upon triggering conditions, ii) in response to operator commands, or iii) combinations of these. Such modifications may include changing drilling parameters, steering the drillbit (e.g., geosteering), changing a mud program, optimizing measurements, and so on. Control of these devices, and of the various processes of the drilling system generally, may be carried out in a completely automated fashion or through interaction with personnel via notifications, graphical representations, user interfaces and the like. Reference information accessible to the processor may also be used.

The processing of the measurements by a processor may occur at the tool, or at a remote location. The data acquisition may be controlled at least in part by the electronics. Implicit in the control and processing of the data is the use of a computer program on a suitable non-transitory machine readable medium that enables the processors to perform the control and processing. The non-transitory machine readable medium may include ROMs, EPROMs, EEPROMs, flash memories and optical disks. The term processor is intended to include devices such as a field programmable gate array (FPGA).

While the present disclosure is discussed in the context of a hydrocarbon producing well, it should be understood that the present disclosure may be used in any borehole environment (e.g., a water or geothermal well).

The present disclosure is susceptible to embodiments of different forms. There are shown in the drawings, and herein are described in detail, specific embodiments of the present disclosure with the understanding that the present disclosure is to be considered an exemplification of the principles of the disclosure and is not intended to limit the disclosure to that illustrated and described herein. While the foregoing disclosure is directed to the one mode embodiments of the disclosure, various modifications will be apparent to those skilled in the art. It is intended that all variations be embraced by the foregoing disclosure.

What is claimed is:

1. A method of determining at least one parameter of interest of a formation, the method comprising:
   using at least one transmitter to initiate at a single location in the formation a first electromagnetic signal at a first frequency above 1 kHz and a second electromagnetic signal at a second frequency above 1 kHz different than the first frequency for propagation through the formation;
   receiving the first electromagnetic signal propagating through the formation and the second electromagnetic signal propagating through the formation at a single receiver non-collocated with the at least one transmitter;
   estimating a relative phase shift of the second electromagnetic signal relative to the first electromagnetic signal;
   estimating a relative attenuation of the second electromagnetic signal relative to the first electromagnetic signal;
   using the relative attenuation and the relative phase shift to estimate a parameter of interest of the formation.

2. The method of claim 1 wherein the receiver is unsynchronized with respect to the transmitter.

3. The method of claim 1 wherein the second frequency is a positive whole number multiple of the first frequency.

4. The method of claim 1 wherein the relative phase shift of the second electromagnetic signal relative to the first electromagnetic signal comprises a difference between the phase of the second electromagnetic signal and the first electromagnetic signal.

5. The method of claim 1 wherein the relative attenuation of the second electromagnetic signal relative to the first electromagnetic signal comprises a logarithmic ratio of the second electromagnetic signal amplitude to the first electromagnetic signal amplitude.

6. The method of claim 1 comprising generating a multifrequency signal comprising a plurality of simultaneous sub-signals at the single location including the first electromagnetic signal and the second electromagnetic signal.

7. The method of claim 1 wherein the second electromagnetic signal transmitted from the transmitter is synchronized with the first transmitted from the transmitter.

8. The method of claim 7 comprising setting an initial phase at the transmitter for the first electromagnetic signal and an initial phase at the transmitter for the second electromagnetic signal equal to zero.

9. The method of claim 7 comprising setting an initial phase at the transmitter for the first electromagnetic signal to a value equal to f1*t, and an initial phase at the transmitter for the second electromagnetic signal to a value equal to f2*t, wherein f1 is the first frequency, f2 is the second frequency, and t is the time from the initial phase.

10. The method of claim 1 comprising using the relative attenuation and the relative phase shift to generate a propagation resistivity.

11. The method of claim 1 comprising conveying a first sub and a second sub along at least one borehole formed in the earth formation, wherein the at least one transmitter is disposed on the first sub and the receiver is disposed on the second sub, the first sub and the second sub lacking electrical communication along the carrier therebetween.

12. The method of claim 1 comprising conducting further operations in the formation in dependence upon the parameter of interest, the further operations at least one of: i) geosteering; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) drilling the borehole; and x) producing one or more hydrocarbons from the formation information.

13. An apparatus for determining at least one parameter of interest of a formation, the apparatus comprising:
- a carrier including at least one electromagnetic (EM) transmitter and at least one electromagnetic (EM) receiver configured to be conveyed in a borehole; and
- at least one processor configured to:
    - use at least one transmitter to initiate at a single location in the formation a first electromagnetic signal at a first frequency above 1 kHz and a second electromagnetic signal at a second frequency above 1 kHz different than the first frequency for propagation through the formation;
    - receive the first electromagnetic signal propagating through the formation and the second electromagnetic signal propagating through the formation at a single receiver of the at least one receiver non-collocated with the at least one transmitter;
    - estimate a relative phase shift of the second electromagnetic signal relative to the first electromagnetic signal;
    - estimate a relative attenuation of the second electromagnetic signal relative to the first electromagnetic signal; and
    - use the relative attenuation and the relative phase shift to estimate a parameter of interest of the formation.

* * * * *